May 21, 1963
N. COSTANZI
3,090,338
SHIP'S HULL FORMATION
Filed May 18, 1959
FIG. 1
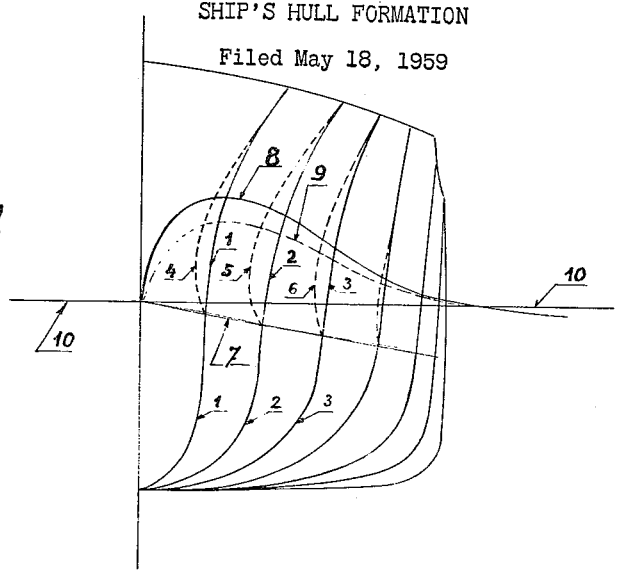
FIG. 2
FIG. 3
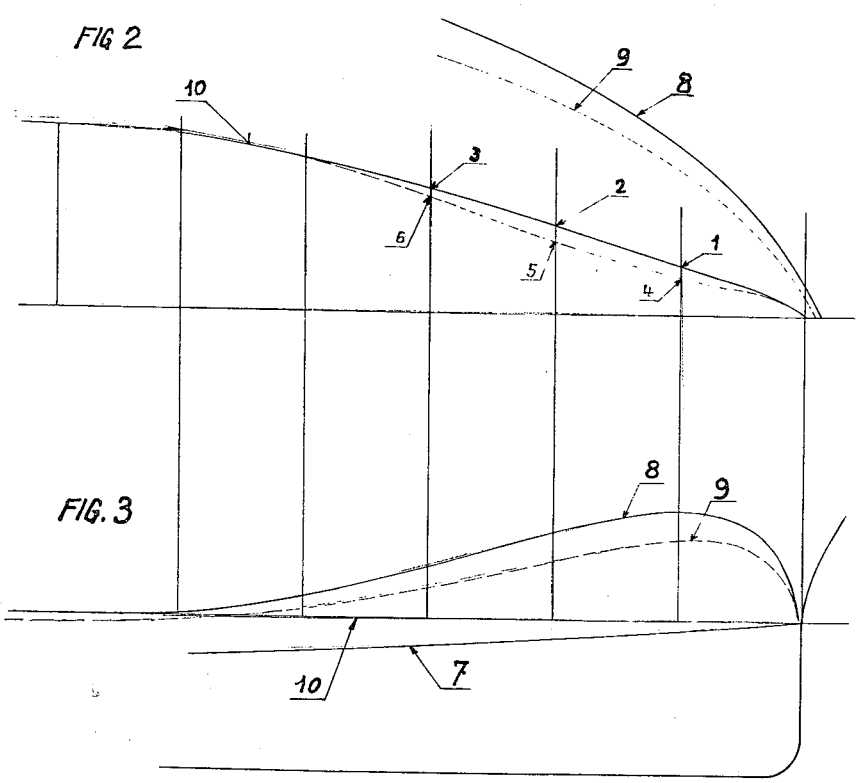
INVENTOR:-
NICOLO COSTANZI
By:- J. Chatwin ATTY.

United States Patent Office 3,090,338
Patented May 21, 1963

3,090,338
SHIP'S HULL FORMATION
Nicolo Costanzi, Monfalcone, Italy, assignor to Cantieri Riuniti Dell'Adriatico S.p.A., Trieste, Italy, a Società per Azioni organized under the laws of Italy
Filed May 18, 1959, Ser. No. 813,977
Claims priority, application Italy May 20, 1958
3 Claims. (Cl. 114—56)

The present invention relates to the hull shaping of ships, its object being to provide an improvement applied mainly above the load water line and intended to reduce the wave-making resistance of the primary wave, whether the hull is provided with a bulge or not.

It consists in that at the load water line and upwards of same the frame sections forward are inwardly recessed as compared with the normal vertical or quasi-vertical frame sections, so that a primary wave hollow is produced in the forward hull lines of the required length to contain the wave profile, both in height and in length, depending on the designed advancement speed of the ship.

It is known that single-screw cargo ships or tankers with main machinery located aft are strictly bound to meet trimming conditions, i.e. even keel trim when fully loaded, thus compelling them to have the longitudinal center of buoyancy placed substantially forward of the amidship point.

As a consequence, the above conditions involve a much fuller fore end as compared with the after end, and the adoption of full sectional areas forward of a rather convex shape and convex water lines does not meet the "optimum" as to minimum wave-making resistance, even in the best designed hull shapes.

It is also known that, so long as the above mentioned forward sections and displacement must be maintained unaltered, any tentative refining with a view to obtaining a finer entrance by any forced alteration to the shape of the cross sectional area is detrimental to speed as a consequence of the increased shoulder form resistance.

The present invention permits a refining of the shape to be obtained without involving any practical deformation, and also refining of both the designed forward sectional areas as well as the water lines below the load water lines, owing to the fact that a frame recessing is applied mainly above the load water line which does not involve any reduction in the pre-fixed sectional areas nor in the fullness nor in the displacement.

The vertical hollowing or recessing of the frames as specified above is a consequence of the discovery that in the wave-making resistance not only the form itself as a displacing hull up to the load water line, but also the portion above same, i.e. the portion included in the contacting area of the primary wave profile, is involved as well.

It is a matter of fact that, for this reason the vertical or quasi-vertical frames are generally extended also above the load water line forward. The present invention differs from the known procedure, insofar as it is based on an inwardly-arched shape forming an angle with the normal frame shape below. This angle, being negative to the vertical, is the cause of local hydrodynamic lowerings of pressures, where instead maximum positive pressures due to the primary wave are produced. The pressure lowering action reduces the height of the wave and, thus, its resistance, as compared with vertical frame sections forward.

As already mentioned above, in order to reduce the resistance, the extension of the arched wave hollow to the hull form, both in height as well as in length, is carried out so as to fully contain the extension and height of the primary wave profile at the ship side, which is being formed at the designed speed, without interfering in practice with the designed general under-water form of the hull, and displacement by the face that the above hollowness is provided mainly above the mean service load water line forward.

The above mentioned arched hollow or recess is clearly shown in the accompanying drawing, wherein:

FIG. 1 represents the projection of the ship sections seen from with the run of the curves (sections) of a normal ship body and also the curves of a ship body provided with the wave arched hollowness, according to the present invention.

FIG. 2 shows the horizontal projection of the same ship at the height of the load water line. This figure incorporates also the water line resulting from the hollow for the bow primary wave.

FIG. 3 is a side projection of the same ship body showing the vertical formation in way of the above mentioned hollow for the bow wave, as well as the wedge running and wave profile with and without hollow.

As already stated hereinbefore, in the above figures the sections of a normal ship, i.e. a ship not provided with the hollow at the bow, are drawn with full lines, whilst those of a ship with recessed frame profile so as to form the hollowness in question, are shown with dotted lines, the foregoing in order to point out the difference between a ship with normal wave profile and another ship incorporating the special bow form constituting the subject of this invention.

Further, in the above three figures, the main bow waves, which are produced at the bows of a ship in motion forwardly are also drawn with full lines, whilst the said main bow waves produced by a ship provided with the arched hollowness at the bow—according to this invention—are drawn with dotted lines.

In particular: Lines 1, 2 and 3 of FIGURES 1 and 2 represent the forward sections of an ordinary ship; lines 4, 5 and 6 are the curves of the frame sections of a ship provided with the primary wave hollowness at her bows covered by this invention.

Reference 7 is the edge where the bow wave hollowness starts from the lower part of the ship body, which edge runs parallel to the stream line flow; the top side of the bow wave hollowness terminates or may terminate evenly with the ship hull form, so that no limiting line is to be seen, depending on practical convenience.

Line 8 of FIGURES 1, 2 and 3 indicates the height and extension in length of a primary wave which is produced at the bows of a normal ship in her advancement at a designed speed; line 9 shows the contour of the same primary wave as it is produced by a ship in her advancement with the same speed, but for a ship provided with the special bow form according to the present invention.

Line 10 is the load water line which is equal for either ship.

From the foregoing description it follows that by means of this particular bow structure it is possible to obtain a decrease in depth and length of the primary wave produced by a ship moving with a determined speed, consequently also a decrease in the resistance that this primary wave opposes to the forward motion of a ship. This can be obtained because, as stated hereinbefore, the form of the bow is altered above the load water line in such a way that both the displacement and the deadweight of the ship remain unaltered, this fact affording advantages as to the attainable ship speed with unchanged propelling power.

The foregoing description and accompanying drawings are to be considered as determinative and not literal expressions, and any solution of the relevant problem arising from the consideration of obtaining a decrease in the depth and extent of the primary wave produced by a ship in her motion ahead by means of a special form of bows fitted with arched hollowness for the bow wave at and above the mean load water line, so that also the resistance due to the primary wave opposing the ahead motion of a ship is decreased accordingly, is to be attributed to the principle of the present invention.

I claim:

1. A ship's hull shaped so as to include, at the bow and symmetrically in each side wall, a recess the lower part of which begins at the stem substantially at the mean load water line and which meets the side wall at an angle along a line extending aft at an inclination below said water line, said recess being of such a height and length as to be at least equal to that of the primary wave caused by forward motion of the hull at maximum speed of the ship.

2. A ship's hull shaped so as to include, at the bow and symmetrically in each side wall, a recess the lower part of which begins at the stem and which meets the side wall at an angle along a line which starts at the stem substantially at the level of the mean load water line and runs aft from said stem at an inclination below said water line, the height and length of the recess being such as to be at least equal to that of the primary wave caused by forward motion of the hull at the designed maximum speed.

3. A ship's hull shaped so as to include, at the bow and symmetrically in each side wall, a recess the lower part of which begins at the stem and which meets the side wall at an angle along a line which starts at the stem substantially at the level of the mean load water line and which runs aft at an inclination below said water line, said recess corresponding in shape and size to the primary wave formed by the forward movement of the hull at the designed maximum speed.

References Cited in the file of this patent

UNITED STATES PATENTS

| | | |
|---|---|---|
| 913,973 | Peterson | Mar. 2, 1909 |
| 1,778,993 | Akinoff | Oct. 21, 1930 |
| 1,831,643 | Yourkevitch | Nov. 10, 1931 |
| 2,167,688 | Scowley | Aug. 1, 1939 |

FOREIGN PATENTS

| | | |
|---|---|---|
| 3,862 | Great Britain | 1883 |